(12) United States Patent  
Sullivan et al.

(10) Patent No.: US 7,876,232 B2  
(45) Date of Patent: Jan. 25, 2011

(54) SYSTEM AND METHOD FOR ILLUMINATION OF A DATA CABLE

(75) Inventors: Marc A. Sullivan, Austin, TX (US); Phillip T. Kortum, Houston, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 549 days.

(21) Appl. No.: 11/923,342

(22) Filed: Oct. 24, 2007

(65) Prior Publication Data

US 2009/0109050 A1  Apr. 30, 2009

(51) Int. Cl.
   *G08B 5/00*  (2006.01)
(52) U.S. Cl. ............ 340/815.4; 340/691.2; 340/815.45; 463/30
(58) Field of Classification Search .............. 340/815.4, 340/815.45, 691.2, 3.7; 439/490; 385/12, 385/901; 463/1, 30; 362/543–545
   See application file for complete search history.

(56) References Cited

U.S. PATENT DOCUMENTS

| | | | | |
|---|---|---|---|---|
| 4,890,102 A | * | 12/1989 | Oliver | 340/815.45 |
| 7,019,658 B1 | * | 3/2006 | Erickson et al. | 340/815.45 |
| 2004/0146254 A1 | | 7/2004 | Morrison | |
| 2005/0023026 A1 | | 2/2005 | Chen | |
| 2005/0182876 A1 | * | 8/2005 | Kim et al. | 710/100 |

* cited by examiner

*Primary Examiner*—Thomas J Mullen  
(74) *Attorney, Agent, or Firm*—Larson Newman & Abel, LLP

(57) ABSTRACT

A data cable includes a plurality of illumination devices, an application module, and a lighting control module. The plurality of illumination devices are adapted to receive a control signal to change an illumination characteristic of the plurality of illumination devices, and the control signal is indicative of a signal characteristic for data to be transmitted over the data cable. The application module is adapted to analyze the data communicated over the data cable to determine the signal characteristic. The lighting control module is connected to the application module and adapted to light the plurality of illumination devices at the data cable based on the signal characteristic.

17 Claims, 4 Drawing Sheets

SYSTEM AND METHOD FOR ILLUMINATION OF A DATA CABLE

FIELD OF THE DISCLOSURE

The present disclosure generally relates to data transfer devices, and more particularly relates to data cables.

BACKGROUND

Cables are sometimes employed to transfer data between electronic devices. A data cable may be used to directly connect one device to another, or to connect a device to a network. The data cable provides a physical medium for communication (i.e. transmission and reception of data). Examples of data cables include but are not limited to Ethernet cables and universal serial bus (USB) cables.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
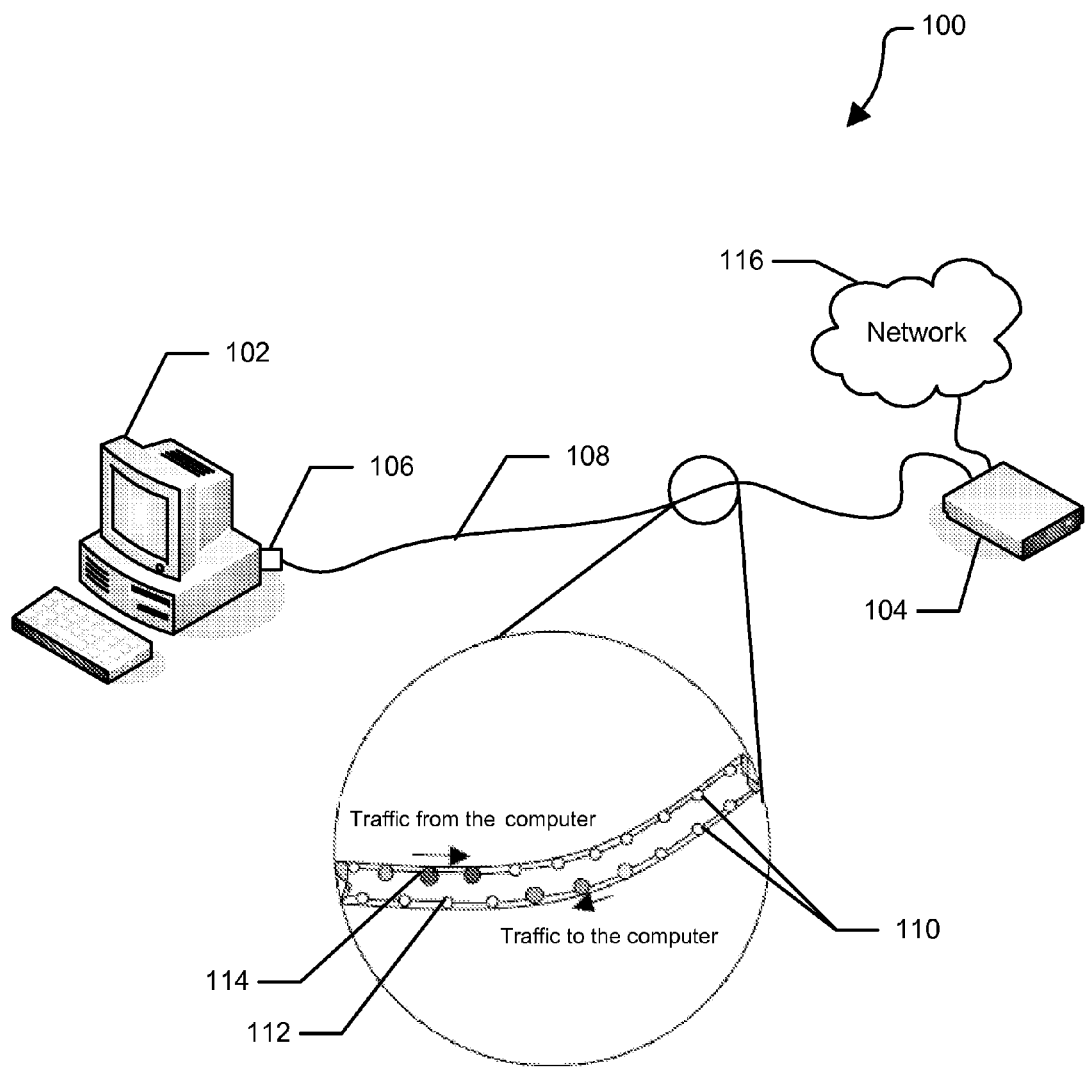
FIG. 1 is a schematic diagram of a particular embodiment of a data network.

FIG. 1 shows a data network 100 including a computer 102, a router 104, a data cable interface 106, and a data cable 108. The computer 102 is connected to the data cable interface 106. The data cable 108 is connected to both the data cable interface 106 and the router 104. The router 104 is connected to a network 116. The data cable 108 includes illumination devices 110 having a first set of illumination devices 112 and a second set of illumination devices 114. The illumination devices 110 can be but are not limited to light emitting diodes (LED) or fiber optic cables. The data cable 108 can be but is not limited to a powered Ethernet data cable, a universal serial bus (USB) data cable, or a similar data cable that can provide power to the illumination devices 110. The data cable 108 can have a transparent outer surface, allowing the illumination devices 110 to be visible to the user.

In the illustrated embodiment, the data cable interface 106 is a separate device from the computer 102, and has physical connectors adapted to connect to both the computer and the data cable 108. In another embodiment, the computer 102 or the router 104 can perform the functionality of the data cable interface 106. In that case, the data cable interface 106 may be physically integrated with the data cable 108.

The computer 102 executes different applications, such as but not limited to online video games or a web browser, that communicate with other computers and systems over the network 116. In particular, an application places data to be communicated in packets and transmits the packets over the data cable 108 to the router 104. The router 104 and servers in the network 116 use a header or another portion of each packet to route the data to another destination.

The data cable 108 provides a physical medium for communication of data between the router 104 and the computer 102. In addition, the illumination devices 110 of the data cable 108 can be individually controlled, depending on the characteristics of the data being communicated through the data cable, to change illumination characteristics of the illumination devices. Examples of such illumination characteristics include but are not limited to which devices are lit, the intensity, and the color of illumination. The illumination devices 110 can be controlled at the data cable interface 106, at the computer 102, and the router 104. For purposes of discussion, it is assumed that the illumination devices 110 are controlled at the computer 102.

The computer 102 can control the lighting of the illumination devices 110 based on any of a variety of factors. In an embodiment, the computer 102 analyzes the data to be transmitted by an application to determine signal characteristics for the data. Examples of signal characteristics include but are not limited to an application event indicating an action performed by a user in the application, an application type, a data type, or an error condition. Based on the signal characteristics, the computer 102 outputs control signals to change one or more characteristics of the illumination devices 110, such as a color, intensity, or a lighting sequence.

Additionally, the computer 102 analyzes the data communicated over the data cable 108 to determine a direction of data flow in relation to the computer (upstream or downstream). Based on the direction of data flow, the computer 102 sends control signals to change one or more characteristics of the illumination devices 110.

As an example, the computer 102 can execute an application for an online video game. When interacting with the game, the user performs an action such as firing a weapon. The computer 102 transmits the user action as data packets over the data cable 108 to the router 104 and the network 116. The computer 102 determines the type of action indicated by the data and based on the action type outputs control signals to change one or more characteristics of the illumination devices 110. For example, the computer 102 can control the illumination devices 110 to represent the firing of the weapon as a brief flash of colored light.

The computer 102 can also analyze the data transmitted over the data cable 108 to determine a direction of data flow. In particular, as the computer 102 receives data, the computer can send a control signal to light the first set of illumination devices 112 in a serial pattern starting at the end of the data cable near the router 104 and traveling toward the computer. As data is transmitted from the computer 102, the traffic characteristic identifies that the direction of the data flow is away from the computer and the second set of illumination devices 114 are lit in a serial fashion starting at the end of the data cable near the computer and traveling toward the router 104.

Figure 2:
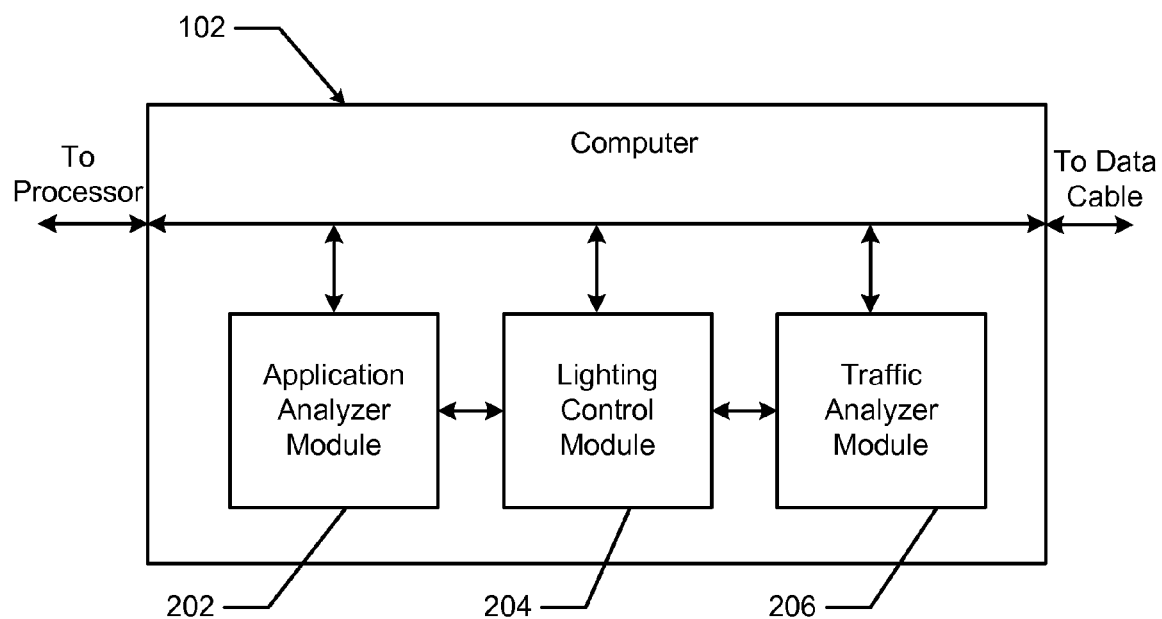
FIG. 2 is a block diagram of a particular embodiment of an electronic device in the data network of FIG. 1.

FIG. 2 shows a block diagram of a particular embodiment of the computer 102 including an application analyzer module 202, a lighting control module 204, and a traffic analyzer module 206. The application analyzer module 202 is connected to a processor (not shown), the lighting control module 204, and the traffic analyzer module 206. The lighting control module 204 is connected to the data cable 108 and the traffic analyzer module 206.

The application analyzer module 202 analyzes the data from an application executed by the computer 102 to determine an application characteristic. Examples of application characteristics include but are not limited to an indication that the data is associated with a particular action performed by a user in the application, an application type, or a data type. Based on the application characteristic, the analyzer module 202 outputs a control signal to change a characteristic of the illumination devices 110.

The traffic analyzer module 206 analyzes the data communicated over the data cable 108 and determines a traffic characteristic for the data. Examples of traffic characteristics include but are not limited to a direction of data flow in relation to the computer or an error condition associated with communication of the data. Based on the traffic characteristic, the traffic analyzer module 206 can output a plurality of control signals for controlling a characteristic of the illumination devices 110.

The lighting control module 204 receives control signals and based on these control signals provides signals to control the lighting of the illumination devices 110. The lighting control module 204 can change the color, the intensity, and the sequence of lighting the illumination devices 110. For example, if the application characteristic indicates that a score associated with an online game has increased, the lighting control module 204 can increase the intensity of the illumination devices 110 and change the color of the illumination devices to blue. However, if the application characteristic indicates a decrease in score or other unfavorable event, the lighting control module 204 can decrease the intensity of the illumination devices 110 and can change the color of the illumination devices to red.

If the control signal received from the traffic analyzer module 206 indicates a particular direction of data flow, the lighting control module 204 can change the sequence of lighting the illumination devices 110. Thus, if the traffic analyzer module 206 determines that the data is to be transmitted from the computer 102, the lighting control module 204 can first light a portion of the illumination devices 110 at the end of the data cable 108 connected to the computer 102 and continue to light additional illumination devices along the data cable toward the router 104. Alternatively, the lighting control module 204 can light the first set of illumination devices 112 when data is being received at the computer 102, and can light the second set of illumination devices 114 when data is being transmitted from the computer. Based on the traffic characteristic, the lighting control module 204 can also change the sequence of lighting the first set of illumination devices 112 and the second set of illumination devices 114.

Figure 3:
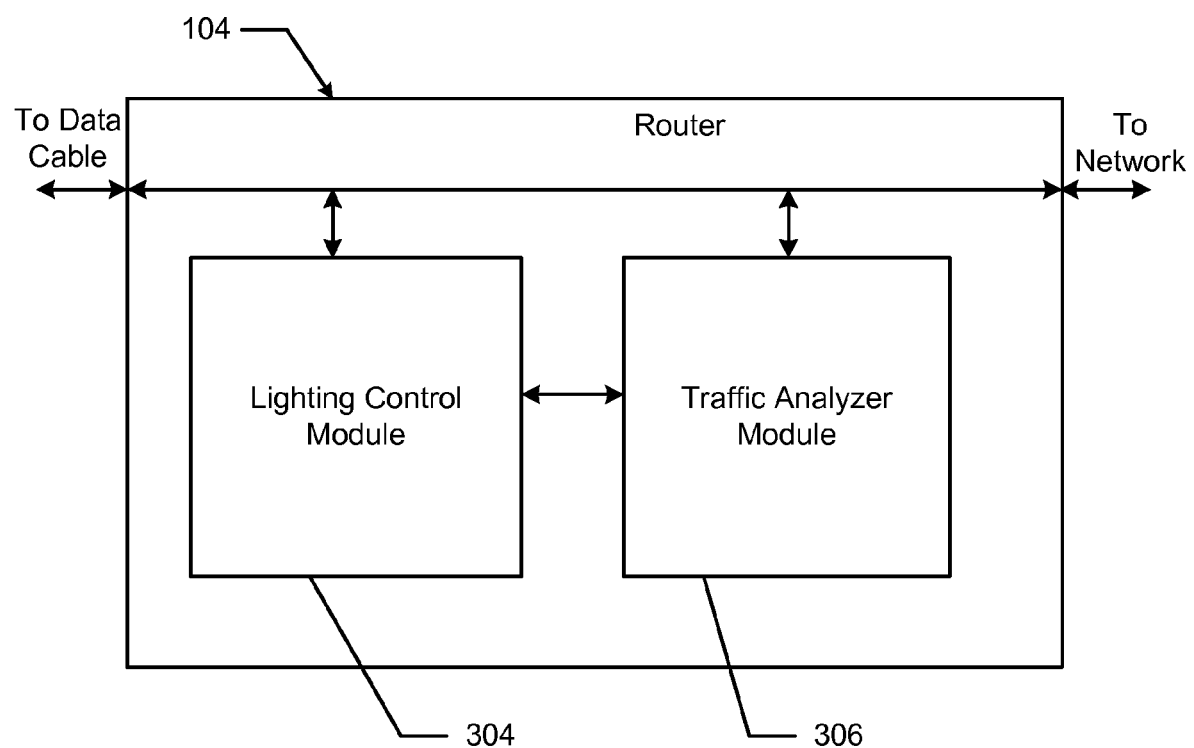
FIG. 3 is a block diagram of a particular embodiment of a router in the data network of FIG. 1.

FIG. 3 shows a block diagram of a particular embodiment of the router 104 including a lighting control module 304 and a traffic analyzer module 306. The lighting control module 304 is connected to the data cable 108 and the traffic analyzer module 306. The lighting control module 304 receives and uses control signals to illuminate the illumination devices 110 at the data cable 108. The traffic analyzer module 306 analyzes the data to be transmitted over the data cable 108 and determines a traffic characteristic for the data. Examples of traffic characteristics include but are not limited to a direction of data flow in relation to the computer, or an error condition for the transmission of the data. For example, the traffic characteristic can indicate that the data from the application is not being properly transmitted over the data cable 108, thereby creating an error condition for the transmission of the data.

The traffic analyzer module 306 determines the traffic characteristic and outputs a plurality of control signals to the lighting control module 304. Based on the control signals received, the lighting control module 304 lights the illumination devices 110 at the data cable 108. For example, if the control signals received from the traffic analyzer module 306 indicate a particular direction of data flow, the lighting control module 304 can change the sequence of lighting the illumination devices 110. Thus, if the traffic analyzer module 306 determines that the router 104 is transmitting the data, the lighting control module 304 can light a portion of the illumination devices 110 at the end of the data cable 108 connected to the router and continue to light additional illumination devices along the data cable toward the computer 102. Alternatively, the lighting control module 304 can light the first set of illumination devices 112 when the router 104 is transmitting data, and can light the second set of illumination devices 114 when the router is receiving data. The lighting control module 304 can also change the sequence of lighting the first set of illumination devices 112 and the second set of illumination devices 114.

Figure 4:
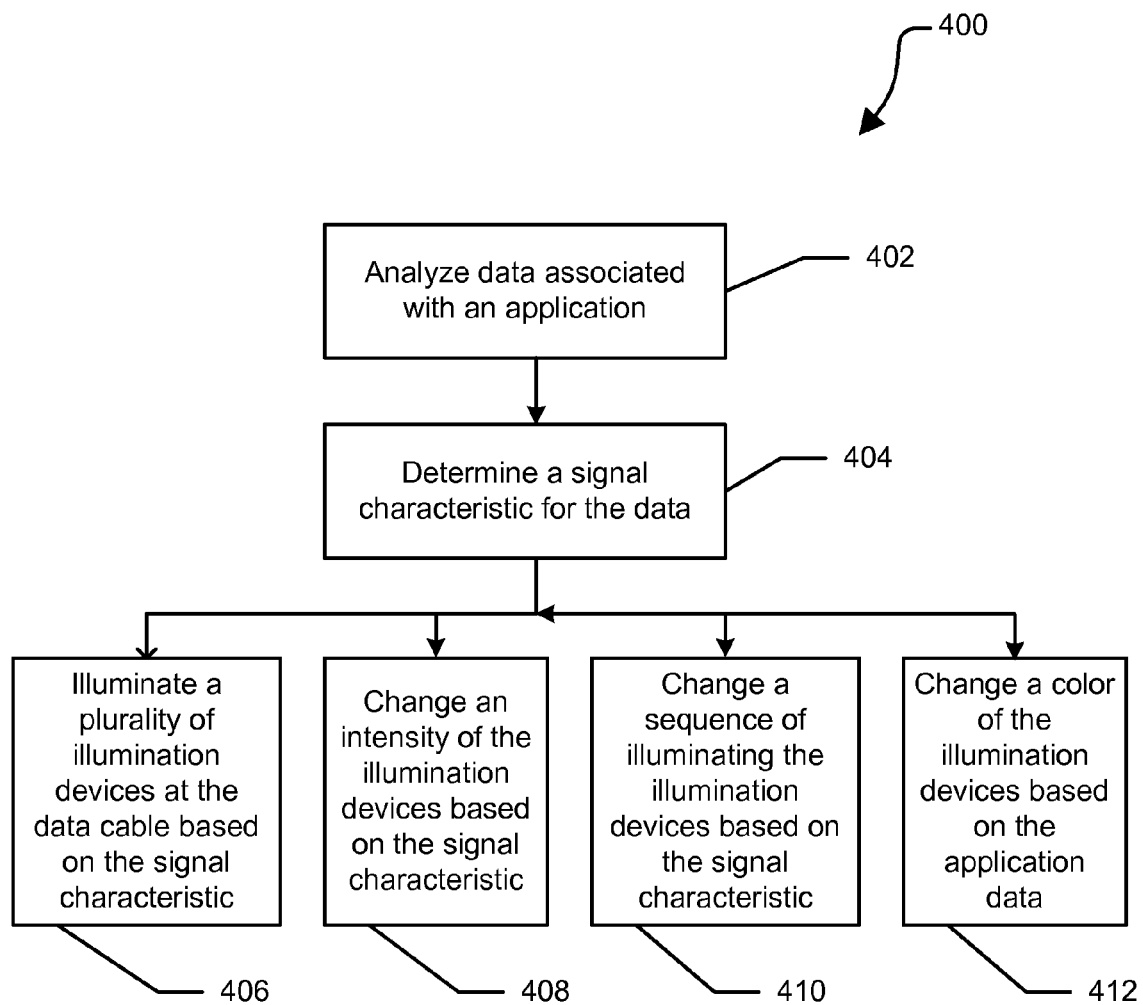
FIG. 4 is a flow chart of a method for controlling illumination of a data cable.

FIG. 4 illustrates a flow diagram of a particular embodiment of a method 400 for controlling illumination of a data cable. At block 402, data to be transmitted over a data cable associated with an application is analyzed to determine a characteristic for the data. Examples of such characteristics include but are not limited to an indication of an action performed by a user in the application, an application type, a data type, or an error condition. At block 404, a signal characteristic is determined for the data. Depending on the signal characteristic, one or more illumination characteristics of the data cable are changed. Based on the signal characteristic, a plurality of illumination devices is lit at block 406. At block 408, based on the signal characteristic, the intensity of one or more of the plurality of illumination devices is changed. Based on the signal characteristic, the sequence of illuminating the plurality of illumination devices is changed at block 410. At block 412, based on the signal characteristic, the color of one or more of the plurality of illumination devices are changed. For example, a user can be accessing a secure website, requiring a username and password. As the user enters the username and password at the login webpage, the color of one or more of the plurality of illumination devices can be set to red. After a username and password are communicated and the website is verifying the information the color of one or more of the plurality of illumination devices can be changed to yellow. Additionally, when the username and password are verified and the user is granted access to the website the color of one or more of the plurality of illumination devices can be changed to green.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   analyzing data communicated over a data cable to determine a direction of data flow over the data cable; and
   lighting a plurality of illumination devices distributed along a length of the data cable to indicate the direction of data flow over the data cable by serially illuminating the plurality of illumination devices.

2. The method of claim 1 wherein lighting the plurality of illumination devices comprises, in response to determining that the direction of data flow is away from a computer device, serially illuminating the plurality of illumination devices starting at an end of the data cable nearest the computer device and traveling toward a destination device.

3. The method of claim 1, further comprising illuminating the plurality of illumination devices based on an application type associated with the data.

4. The method of claim 1 wherein lighting the plurality of illumination devices comprises changing an intensity of one of the plurality of illumination devices.

5. The method of claim 1 wherein lighting the plurality of illumination devices comprises changing a sequence of lighting the plurality of illumination devices.

6. The method of claim 1 wherein lighting the plurality of illumination devices comprises changing a color of one of the plurality of illumination devices.

7. A device comprising:
   a traffic module adapted to analyze data communicated over a data cable to determine a signal characteristic indicating a user interaction with an application; and
   a lighting control module connected to the traffic module, the lighting control module adapted to light a plurality of illumination devices distributed along the length of the data cable based on the signal characteristic to indicate that the user interaction is a first type of interaction, wherein the application comprises a game application, the user interaction comprises the firing of a weapon in the game application, and the lighting control module is adapted to light the plurality of illumination devices in response to the firing of the weapon.

8. The device of claim 7 wherein the lighting control module is adapted to light a first subset of the plurality of illumination devices in response to a direction of data flow over the data cable being away from a computer.

9. The device of claim 8 wherein the lighting control module is adapted to light a second subset of the plurality of illumination devices in response to the direction of data flow being toward the computer.

10. The device of claim 7 wherein the lighting control module is adapted to change an intensity of one of the plurality of illumination devices based on the user interaction.

11. The device of claim 7 wherein the lighting control module is adapted to change a sequence of lighting the plurality of illumination devices based on the user interaction.

12. The device of claim 7 wherein the lighting control module is adapted to change a color of one of the plurality of illumination devices based on the user interaction.

13. A device comprising:
    a traffic analyzer module adapted to analyze a direction of data flow over a data cable; and
    a lighting control module responsive to the traffic analyzer module, the lighting control module adapted to light a plurality of illumination devices distributed along a length of the data cable to indicate the direction of data flow by serially illuminating the plurality of illumination devices.

14. The device of claim 13 wherein the lighting control module is adapted to light a first subset of the plurality of illumination devices in response to data being transmitted from the device.

15. The device of claim 14 wherein the lighting control module is adapted to light a second subset of the plurality of illumination devices in response to data being received at the device.

16. A data cable comprising:
    a plurality of illumination devices distributed along a length of the data cable, the plurality of illumination devices adapted to receive a control signal to serially illuminate the plurality of illumination devices to indicate a direction of data flow over the data cable.

17. The data cable of claim 16 wherein the plurality of illumination devices are further adapted to change an illumination characteristic of the plurality of illumination devices based on the control signal, the illumination characteristic selected from the group consisting of an intensity, a color, and a sequence of illumination.

* * * * *